Jan. 11, 1955   J. C. CALDWELL   2,699,023
ROTARY HARROW

Filed March 9, 1954   2 Sheets-Sheet 1

INVENTOR.
JAMES C. CALDWELL
BY
McMorrow, Berman & Davidson
ATTORNEYS

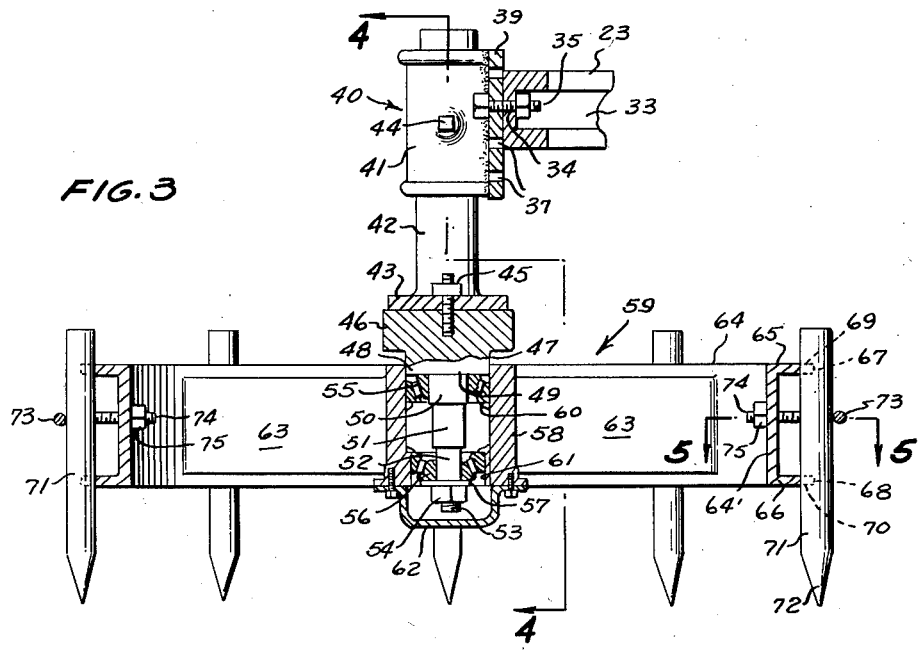

United States Patent Office 2,699,023
Patented Jan. 11, 1955

2,699,023

ROTARY HARROW

James C. Caldwell, Gonzales, La.

Application March 9, 1954, Serial No. 415,038

3 Claims. (Cl. 55—13)

This invention relates to improvements in rotary harrows, and more particularly to an improved double rotor harrow in which the rotors are laterally spaced from each other and are oppositely angled with respect to the horizontal, the primary object of the invention being to provide a harrow of this kind, which is especially but not exclusively, adapted for cultivating ridge or elevated row crops, in such a way that the ground or earth constituting the slanting sides of such ridges or rows is thoroughly broken up while the crests of the ridges or rows are left unimpaired or are desirably built up and rendered uniform.

Another important object of the invention is to provide a more efficient and practical rotary harrow cultivator of the character indicated above which is designed for mounting upon the drawbar structures of existing tractors, and which involves means for adjusting the lateral spacing of the rotors, the angulation of the rotors relative to the horizontal to conform to or to change the slant of the sides of rows or ridges, and for adapting the harrow to tractors of different makes and models.

Other important objects and advantageous features of the invention will be apparent from the following description and the accompanying drawings, wherein, for purposes of illustration rather than limitation, a specific embodiment of the invention is set forth in detail.

In the drawings:

Figure 3 is an enlarged fragmentary transverse vertical section taken on the line 3—3 of Figure 1;

Figure 4 is a fragmentary transverse vertical section taken on the line 4—4 of Figure 3; and Figure 5 is a fragmentary horizontal section taken on the line 5—5 of Figure 3.

Figure 1:
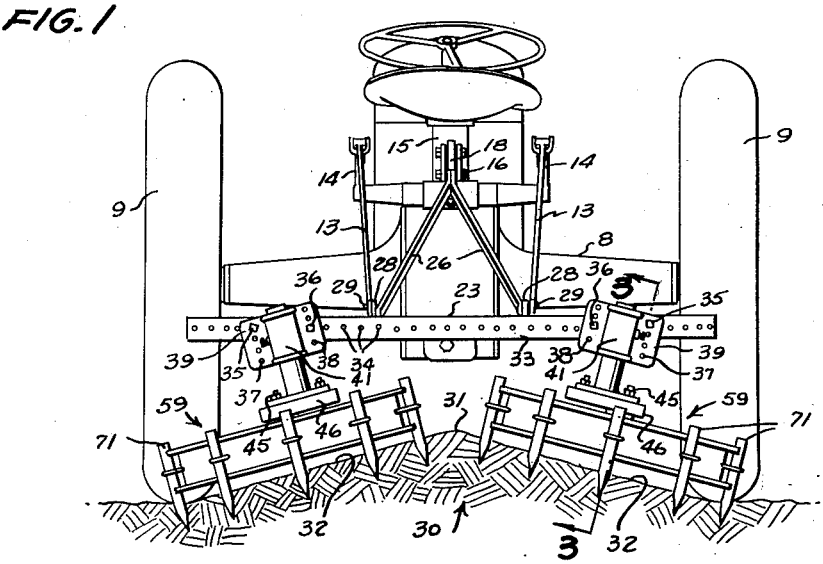
Figure 1 is a rear elevation showing said embodiment installed on a tractor and in operative relation to a ridge or row, the last being shown in section.

Referring in detail to the drawings, wherein like numerals designate like parts throughout the several views, the numeral 7 generally designates a conventional form of farm tractor having a rear axle housing 8, ground engaging wheels 9, 9, lift arms 10, 10 pivoted to the underside of the axle housing 8 at their forward ends, as indicated at 11, 11 and having rear ends 12, 12. The lift arms 10, 10 are connected by links 13, 13 to the usual hydraulically operated levers 14, 14 which are mounted on an elevated rear body portion 15 of the tractor 7. Pivotally connected at its forward end at 16 to the control rod 17 for the valve for the hydraulic actuator is the compression link 18 which has a rear end 19.

The illustrated harrow, generally designated 20, comprises a horizontal, transversely elongated open rectangular frame 21, which includes front and rear transverse members 22 and 23, respectively, spaced by and connected at their ends to the forward and rearward ends of longitudinal end members 24, 24.

Rigidly connected at their lower ends to the front and rear frame members 22 and 23 at points thereon which are spaced from each other and from the ends of the members 22 and 23 are mutually convergent front and rear standards 25 and 26, respectively. The upper ends of related standards 25 and 26 are joined together and are traversed by a pivot bolt 27 which also traverses the rearward end 19 of the compression link 18.

Fixed lugs 28 rising from the front frame member 22 outside of the front standards 26, 26 have pivot bolts 29, 29 thereon which traverse the rearward ends 12, 12 of the lift arms 10, 10. In this way the frame 21 is supportably carried by the tractor 7 and can be readily and easily moved to put the harrow 20 into and out of operative relation to a crop row or ridge 30 having the crest 31 and the oppositely slanting sides 32, 32; and adjusted to a horizontal or level or any other such position desired, by the driver of the tractor 7 by manipulating the usual hydraulic control means (not shown).

The rear transverse frame member 23 has a vertical rear flange 33 which is provided with a row of longitudinally spaced bolt holes 34 for selective reception of outboard and inboard clamping bolts 35 and 36, respectively.

The clamping bolts 35 and 36 extend through selected ones of outboard and inboard rows of bolt holes 37 and 38, respectively, provided in opposite end portions of the plates 39 of rotor mounting brackets 40. Each mounting bracket 40 includes a vertical sleeve 41 fixed on its rearward side which receives therein a shank 42 on whose lower end is an elongated fixed flange 43. A set screw 44 traverses the side wall of the sleeve 41 and engages the shank 42 so as to lock the shank in a selected vertically and axially rotated position in the sleeve 41.

Bolted as indicated at 45, 45 to the underside of the flange 43 is a similarly shaped crank arm 46. From one end of the crank arm 46 a fixed stubshaft 47 depends, whose axis is eccentric with respect to the axis of the shank 42.

As shown in Figure 3 of the drawings, the stubshaft 47 includes a relatively large diameter upper portion 48 having a shoulder 49 on its lower end, an upper reduced portion 50 below the shoulder 49, an intermediate smaller diameter portion 51 below the portion 50, and a lower further reduced portion 52 which has a threaded free lower end 53 on which a nut 54 is threaded.

An upper roller thrust bearing 55 is engaged on the reduced upper stubshaft portion 50 and a lower roller thrust bearing 56 is engaged around the lower reduced stubshaft portion 52, and the nut 54 holds a washer 57 against the underside of the lower thrust bearing 56.

Both of the bearings 55 and 56 are confined within a tubular hub 58 of a rotor 59 by upper and lower retaining means, such as are indicated at 60 and 61, respectively. The lower end of the hub 58 is closed by a removable cover plate 62.

Spokes 63 radiate from the hub 58 and have their outer ends fixed to the vertical web 64' of a channel cross section rotor rim 64, the rim 64 having spaced upper and lower flanges 65 and 66, respectively, having peripheral edges 67 and 68, respectively.

At equally spaced and vertically aligned intervals the peripheral edges 67 and 68 of the rotor rim flanges 65 and 66, respectively, are provided with half-round notches 69 and 70, respectively, in which are positioned cylindrical vertical harrow teeth 71 having pointed lower ends 72.

The harrow teeth 71 are removably and adjustably held in the notches 69 and 70 by means of U-bolts 73 having threaded legs 74, 74 traversing the rotor rim web 64' carrying nuts 75.

Figure 2:
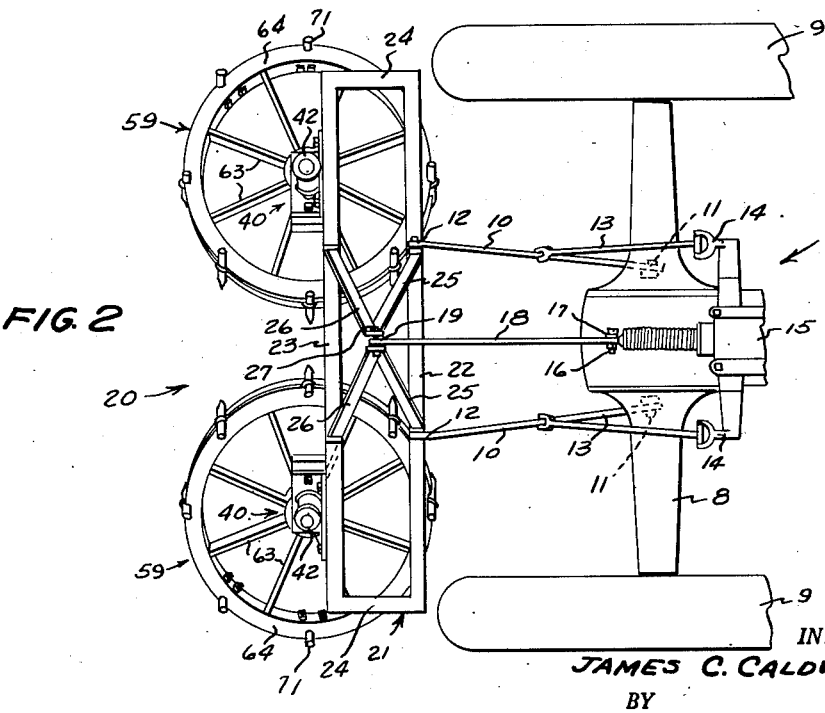
Figure 2 is a fragmentary top plan view of Figure 1.

As shown in Figure 1 of the drawings, the rotors 59, 59 are adjusted on the frame 21 to have the desired laterally outward and downward inclinations to conform to the slants of the ridge sides 32, 32 by means of engagement of the mounting bolts 35 and 36 with selected holes 37 and 38, respectively, in the bracket plates 39, and selective engagement of these bolts through holes 34 of the web or flange 33 of the rear frame member 23, as shown in Figure 2 of the drawings.

With the rotors 59, 59 adjusted as desired or required, forward movement of the tractor along the ridge 30, and in line therewith, with the ridge peak 31 between the rotors 59, 59 will produce rotation of the rotors 59, 59 with the teeth 71 in contact with and biting into the ridge sides, so as to thoroughly break up and work the soil thereof, without disturbing the ridge peak 31 which is untouched by the rotor teeth 71.

What is claimed is:

1. In a rotary harrow, a horizontal frame having front and rear transverse members, brackets fixed on said rear frame member at spaced intervals therealong, vertical sleeves on said brackets, said sleeves being canted in opposite inboard directions toward each other and relative to said frame, and rotors comprising shanks rotatably engaged in the sleeves and depending therefrom, retaining means retaining the shanks in selected rotary and vertically adjusted positions in said sleeves, crank arms fixed on the lower ends of said shanks, stub axles fixed to and depending from said crank arms, the stub axles being parallel to and eccentric with respect to the axes of said shanks, and harrow rotors journaled on and depending from said stub axles, the rotors being in planes canted at opposite laterally outward and downward angles relative to said frame for operating upon the slanting sides of a crop ridge.

2. In a rotary harrow, a horizontal frame having front and rear transverse members, brackets fixed on said rear frame member at spaced intervals therealong, vertical sleeves on said brackets, said sleeves being canted in opposite inboard directions toward each other and relative to said frame, and rotors comprising shanks rotatably engaged in the sleeves and depending therefrom, retaining means retaining the shanks in selected rotary and vertically adjusted positions in said sleeves, crank arms fixed on the lower ends of said shanks, stub axles fixed to and depending from said crank arms, the stub axles being parallel to and eccentric with respect to the axes of said shanks, and harrow rotors journaled on and depending from said stub axles, the rotors being in planes canted at opposite laterally outward and downward angles relative to said frame for operating upon the slanting sides of a crop ridge, said stub axles being located at the outboard sides of said shanks.

3. In a rotary harrow, a horizontal frame having front and rear transverse members, brackets fixed on said rear frame member at spaced intervals therealong, vertical sleeves on said brackets, said sleeves being canted in opposite inboard directions toward each other and relative to said frame, and rotors comprising shanks rotatably engaged in the sleeves and depending therefrom, retaining means retaining the shanks in selected rotary and vertically adjusted positions in said sleeves, crank arms fixed on the lower ends of said shanks, stub axles fixed to and depending from said crank arms, the stub axles being parallel to and eccentric with respect to the axes of said shanks, and harrow rotors journaled on and depending from said stub axles, the rotors being in planes canted at opposite laterally outward and downward angles relative to said frame for operating upon the slanting sides of a crop ridge, said rear frame member having a vertical flange provided with longitudinally spaced bolt holes, said brackets comprising vertical plates engaged with said vertical flange, said bracket plates being provided with laterally spaced outboard and inboard rows of vertically spaced bolt holes, and outboard and inboard clamping bolts extending through selected ones of the outboard and inboard bracket plate holes, respectively, and through selected ones of the rear frame member flange holes.

References Cited in the file of this patent

UNITED STATES PATENTS

| Number | Name | Date |
|---|---|---|
| 689,515 | Rakestraw | Dec. 24, 1901 |
| 1,013,675 | Mitchell | Jan. 2, 1912 |
| 2,061,694 | Cuddigan | Nov. 24, 1936 |
| 2,118,180 | Ferguson | May 24, 1938 |
| 2,388,689 | Hebert | Nov. 13, 1945 |
| 2,586,254 | Pitre | Feb. 19, 1952 |
| 2,645,989 | Prince | July 21, 1953 |